UNITED STATES PATENT OFFICE.

S. DAVIS, OF MONTREAL, CANADA.

IMPROVED CIGAR.

Specification forming part of Letters Patent No. 44,695, dated October 11, 1864.

*To all whom it may concern:*

Be it known that I, S. DAVIS, a citizen of the United States, at present residing at Montreal, in the Province of Canada, have invented a new and useful Improvement in the Manufacture of Cigars; and I do hereby declare that the following is a full, clear, and exact description thereof, which will enable others skilled in the art to make and use the same.

This invention consists of cigars made of a composition of tobacco-leaves mixed with a small quantity of the leaves of belladonna, in such a manner that the specifics contained in the said plant are introduced into the system of the human body, together with the tobacco-smoke, in a finely-divided state, and thereby the healing qualities of said plants are enabled to exert a much more powerful effect than they can when introduced into the system in the ordinary manner.

The proportion in which I mix the tobacco-leaves and the medical plants together is about as follows: tobacco-leaves, one ounce, or enough to make a cigar; leaves of belladonna, one-half grain. The leaves of the belladonna are bruised between suitable rollers and mixed with the tobacco before rolling the cigars, and thus mixed the tobacco-leaves are rolled up into cigars in the usual manner.

The effect of my cigars (which I term "specific" cigars) on the system of the smoker naturally differs according to the nature of the medical plant mixed with the tobacco. Cigars containing belladonna, for instance, will be found almost magical in relieving all the distressing symptoms of the following diseases, viz: neuralgia, liver complaints, bronchitis, spasmodic complaints, especially of the stomach, epilepsy, amblyopy, or short-sightedness, intermittent fever, gout, and all kindred diseases. The cigars containing digitalis will instantly ameliorate and eventually cure the following complaints: organic diseases of the heart, dropsy, weak lungs, nervousness, incipient consumption, &c.

It is obvious that by mixing other medical plants with the tobacco other diseases may be reached in the same effective and easy manner.

I am aware that medicated cigars have before been made by soaking tobacco-leaves in the extracts of certain plants; also, that it is common to form the leaves of medicinal plants into cigars without tobacco; also, that scented cigars are made by the use of shreds of cascarilla or other fragrant material rolled up within the tobacco-leaves.

What I claim as new, and desire to secure by Letters Patent, is—

As a new article of manufacture, a medicated cigar composed of tobacco-leaves mixed with the leaves of belladonna in the manner and proportions herein specified.

S. DAVIS.

Witnesses:
    GEO. GUSTAVE, M. D.,
    DAVID WEIL.